C. GENTLE.
COFFEE URN.
APPLICATION FILED JAN. 12 1920.
1,359,355.
Patented Nov. 16, 1920.
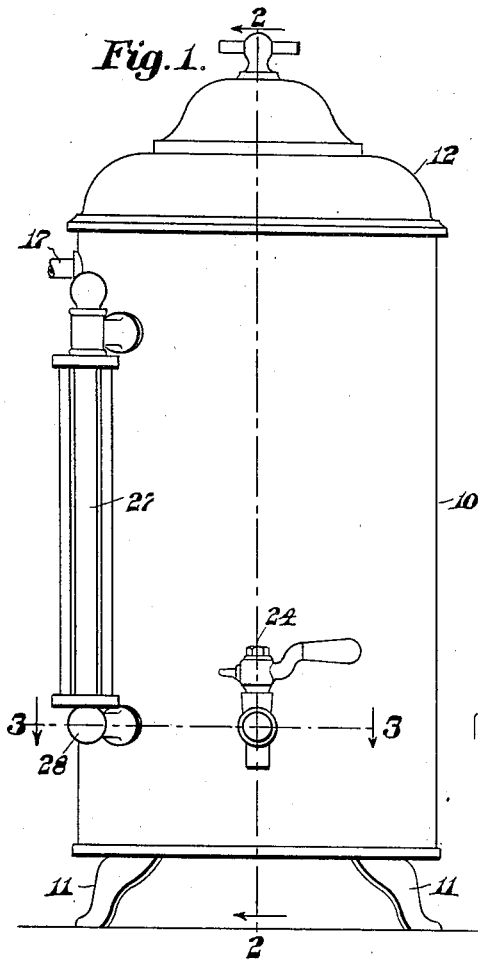
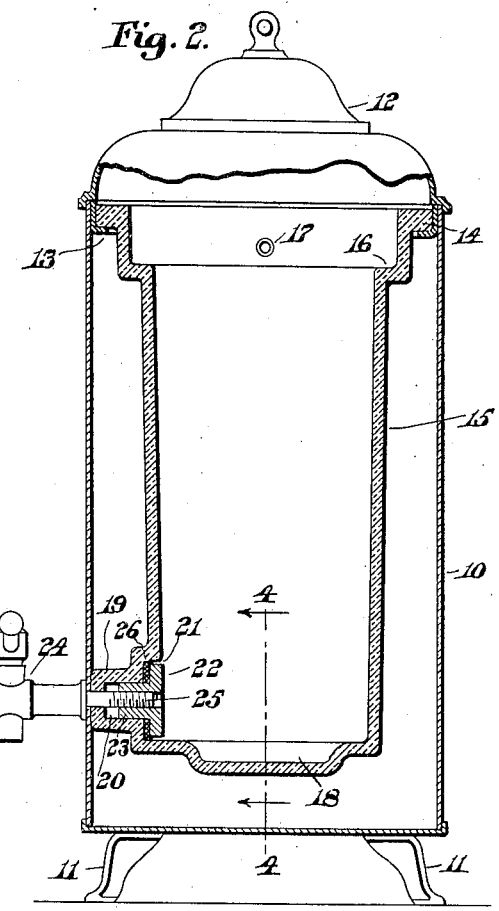
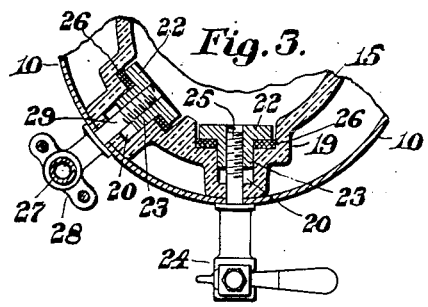
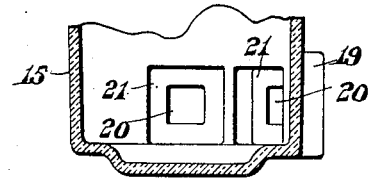
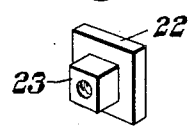
Inventor:
Cuthbert Gentle,
by Walter E. Lombard,
Atty.

UNITED STATES PATENT OFFICE.

CUTHBERT GENTLE, OF WINTHROP, MASSACHUSETTS.

COFFEE-URN.

1,359,355.   Specification of Letters Patent.   Patented Nov. 16, 1920.

Application filed January 12, 1920. Serial No. 351,046.

*To all whom it may concern:*

Be it known that I, CUTHBERT GENTLE, a subject of the King of Great Britain, and a resident of Winthrop, in the county of Suffolk and Commonwealth of Massachusetts, have invented certain new and useful Improvements in Coffee-Urns, of which the following is a specification.

This invention relates to coffee urns and particularly to devices of this character which are used in restaurants, lunch rooms and the like.

The object of the invention is to provide a coffee urn free from pipes and passages which are liable to become clogged with sediment and in which the inner receptacle may be removed with little difficulty when it is desired to clean either the receptacle or the outer casing.

The invention consists of providing the outer casing with inward projections on which rests the annular flange of an inner earthenware receptacle provided with a shoulder adapted to support the usual coffee-bag and having a depression in the bottom in which the sediment is adapted to collect.

The invention further consists in providing said inner receptacle near the bottom with lateral projections having flat-sided openings therethrough terminating at the inner end in recesses in which are disposed non-revoluble nuts coacting with the threaded shanks of the faucet and a gage-supporting member.

The invention further consists in certain novel features of construction and arrangement of parts which will be readily understood by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Figure 1 represents a front elevation of a coffee urn embodying the principles of the present invention.

Fig. 2 represents a vertical section of the same on line 2, 2, on Fig. 1, a portion of the cover being shown in elevation.

Fig. 3 represents a partial horizontal section on line 3, 3, on Fig. 1.

Fig. 4 represents a partial vertical section on line 4, 4, on Fig. 2, and

Fig. 5 represents a perspective view of one of the non-revoluble nuts.

Similar characters indicate like parts throughout the several figures of the drawings.

In the drawings, 10 is a casing or jacket mounted upon legs 11 and provided with the usual cover 12. Within the upper end of the casing or jacket 10 is secured a cup-shaped member 13 forming a support for an annular flange 14 on the upper end of an earthenware receptacle 15.

This earthenware receptacle 15 is provided near its upper end with a shoulder 16 adapted to support the upper end of the usual bag for retaining the ground coffee.

A pipe 17 leads into the upper end of the receptacle 15 through the casing 10 and is adapted to admit water to the receptacle as desired.

The bottom of the receptacle 15 is provided with a central depression 18 in which any sediment is adapted to collect without interfering with the withdrawal of the liquid coffee from the receptacle.

Near the lower end of the receptacle 15, said receptacle is provided with two lateral projections 19 each having a square or flat-sided opening 20 therein terminating at its inner end in a square or flat-sided recess 21.

In each recess 21 is disposed the square head 22 of a non-revoluble nut, the shank 23 of which is square or flat-sided and fits into the opening 20.

The discharge faucet 24 is provided with a threaded shank 25 which extends through the casing or jacket 10 and coacts with one of the nuts 22—23. In each recess 21 surrounding the shank 23 is a washer 26 of paper or other compressible material.

When the shank 25 of the faucet 24 is screwed into the nut 22, the washer 26 will be compressed and make a tight joint while the end of the projection 19 will be forced into contact with the inner wall of the casing or jacket 10 thereby preventing any movement of the receptacle 15 within the casing 10.

The usual gage 27 is provided having at the bottom thereof a supporting member 28 which has a threaded shank 29 which coacts with the other non-revoluble nut 22—23.

Heretofore in devices of this character the coffee is withdrawn from the inner receptacle through pipes and passages which pipes were easily clogged with sediment thereby often preventing the free passage of the coffee to the faucet 24.

These pipes and passages are not easily cleaned and in order to avoid these objectionable features is one of the principal objects of the present invention.

It will be noted that the gage 27 connects with the receptacle 15 by a connection entirely independent of the connecting passage to the faucet 24.

It is obvious that in the present construction all of the sediment will accumulate in the depression 18 and at a point below the passage to the discharge faucet 24 so that only clear liquid coffee will pass through the discharge opening to said faucet.

The earthenware receptacle will not be affected by the coffee contained therein and the nuts 22—23 and washers 26 are made of material which will not be acted upon chemically by the coffee.

As a consequence, an absolutely clear liquid coffee will be made in the receptacle free from sediment and discoloration.

When it is desired to clean either the receptacle 15 or the casing 10, the faucet 24 and supporting member 28 may be unscrewed quickly from the nuts 22—23 and the entire inner receptacle 15 lifted from the casing 10.

By means of this construction the metal tubes and solder connected therewith are entirely eliminated which obviously is a great advantage. Moreover in the present construction there is no necessity for the rubber connections which are generally used in the urns now upon the market.

While in the drawings the openings 20, recesses 21, heads 22 and shanks 23 are all shown as square, it is obvious that if desired either the openings 20 or the recesses 21 may be made of other shape and the heads 22 and shanks 23 be made to fit, it only being essential that at some point there should be a flat side to the discharge opening to coact with a flat side of the nut 22—23 to prevent the rotation of said nut.

It is believed that the operation of the invention and its many advantages will be fully understood without further description.

Having thus described my invention, I claim:

1. A coffee urn consisting of an outside casing having a supporting flange near the top thereof; a removable inner receptacle having at its upper end an outwardly extending member positioned on said supporting flange and provided near the bottom with an outwardly extending recessed projection the outer end of which is adapted to contact with the inner wall of said casing; a non-revoluble nut in the recess of said projection; a flanged tubular member extending through the outer casing and threaded to said nut.

2. A coffee urn consisting of an outside casing; a removable earthenware inner receptacle having at its upper end an annular flange resting on an inward projection on said casing and provided near the bottom with a lateral projection having a recess in its inner end; a non-revoluble nut removably mounted in the recess of said projection; and a threaded tubular member extending through the wall of said casing and coacting with said nut.

3. A coffee urn consisting of an outside casing; a removable earthenware inner receptacle having at its upper end an annular flange resting on an inward projection on said casing and provided near the bottom with a lateral projection having a recess in its inner end; a non-revoluble nut removably mounted in the recess of said projection; and a faucet provided with a threaded tubular shank extending through the wall of said casing and coacting with said nut.

4. A coffee urn consisting of an outside casing; a removable earthenware inner receptacle having at its upper end an annular flange resting on an inward projection on said casing and provided near the bottom with a lateral projection having a recess in its inner end and having a flat-sided passage extending from said recess toward the end thereof; a non-revoluble nut removably mounted in the recess and passage of said projection; and a threaded tubular member extending through the wall of said casing and coacting with said nut.

5. A coffee urn consisting of an outside casing; a removable earthenware inner receptacle having at its upper end means for supporting it on said casing and provided near the bottom with two lateral projections having flat-sided passages therein terminating at the inner end in enlarged recesses; a headed nut removably mounted in each recess and passage; a faucet with a threaded tubular shank extending through said casing and coacting with one nut; and a gage-supporting member provided with a threaded tubular shank coacting with the other nut.

6. A coffee urn consisting of an outside casing having a supporting flange near the top thereof; a removable inner receptacle having at its upper end supporting means therefor resting on said flange and provided near the bottom thereof with an outwardly extending projection having a round opening through the outer wall thereof communicating with a flat-sided recess in the inner end of said projection; a removable flat sided nut in said recess; a tubular member provided with a shoulder bearing against the outer wall of said casing and having a tubular shank threaded to said nut and adapted when rotated to force the outer end of said projection into contact with the inner wall of said casing.

Signed by me at 746-7 Old South Bldg., Boston, Mass., this 7th day of January, 1920.

CUTHBERT GENTLE.

Witnesses:
NORMAN GENTLE,
WALTER E. LOMBARD.